(12) United States Patent
Ahler et al.

(10) Patent No.: US 9,152,908 B2
(45) Date of Patent: Oct. 6, 2015

(54) METHOD FOR LOCATING PERSONS AND/OR MOBILE MACHINES IN MINE CAVERNS USING RFID TECHNOLOGY, AND LONGWALL FACE EXTRACTION INSTALLATION FOR CARRYING OUT THE METHOD

(75) Inventors: Marco Ahler, Mülheim (DE); Sascha Stelter, Dorsten (DE); Andreas Westphalen, Dortmund (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 224 days.

(21) Appl. No.: 13/637,299

(22) PCT Filed: Mar. 24, 2011

(86) PCT No.: PCT/IB2011/051251
§ 371 (c)(1),
(2), (4) Date: Jan. 28, 2013

(87) PCT Pub. No.: WO2011/121500
PCT Pub. Date: Oct. 6, 2011

(65) Prior Publication Data
US 2013/0194079 A1      Aug. 1, 2013

(30) Foreign Application Priority Data
Apr. 1, 2010   (DE) .......................... 10 2010 016 317

(51) Int. Cl.
*H04Q 5/22*      (2006.01)
*G06K 19/07*     (2006.01)
(Continued)

(52) U.S. Cl.
CPC ............ *G06K 19/0723* (2013.01); *E21F 17/18* (2013.01); *G01S 5/0045* (2013.01); *G01S 5/02* (2013.01); *E21D 2023/148* (2013.01); *G01S 1/68* (2013.01)

(58) Field of Classification Search
CPC ................................. H04Q 5/22; E21F 17/18
USPC ........ 340/10.42, 539.13, 10.1, 573.1, 539.11, 340/539.22; 367/127
See application file for complete search history.

(56) References Cited

U.S. PATENT DOCUMENTS 5,268,683 A     12/1993  Stolarczyk
5,635,907 A *   6/1997   Bernard et al. ............ 340/573.4
(Continued)

FOREIGN PATENT DOCUMENTS

CN    101029930 A    9/2007
RU    2234136 C2     8/2004

OTHER PUBLICATIONS

International Search Report for International Application No. PCT/IB2011/051251, mail date Jun. 19, 2012, 3 pages.
(Continued)

*Primary Examiner* — Toan N Pham

(57) ABSTRACT

A method and a longwall face extraction installation have a device for locating persons and/or mobile machines in mine caverns using RFID technology. Base stations are arranged in a distributed manner along the mine cavern to be monitored and have a transmitter and a receiver. At least one RFID transponder is associated with the person or machine to be located, which has stored identification data, can be activated using the base station and can be read in a contactless manner using the base station. In order to provide a method for locating persons and a longwall face extraction installation, in particular for coal mining, which make it possible to effectively use RFID technology, the transmitters of adjacently positioned base stations along a region of the mine cavern to be monitored successively emit their transmission wave in order to activate an RFID transponder.

19 Claims, 3 Drawing Sheets

(51) Int. Cl.
*E21F 17/18* (2006.01)
*G01S 5/00* (2006.01)
*G01S 5/02* (2010.01)
*E21D 23/14* (2006.01)
*G01S 1/68* (2006.01)

(56) References Cited

U.S. PATENT DOCUMENTS

| | | | |
|---|---|---|---|
| 6,339,709 B1 * | 1/2002 | Gladwin et al. | 455/115.1 |
| 6,512,312 B1 | 1/2003 | Herkenrath | |
| 7,511,625 B2 * | 3/2009 | Mardirossian | 340/573.1 |
| 8,115,622 B2 * | 2/2012 | Stolarczyk et al. | 340/539.13 |
| 8,294,568 B2 * | 10/2012 | Barrett | 340/539.11 |
| 2006/0087443 A1 | 4/2006 | Frederick | |
| 2011/0309931 A1 * | 12/2011 | Rose | 340/539.13 |

OTHER PUBLICATIONS

Chinese Search Report from corresponding Chinese Patent Application No. 201180026922.4, issued May 19, 2014, 1 page.

Russian Office Action from corresponding Russian Patent Application No. 2012-146509, issued on Feb. 24, 2015, 3 pages.

* cited by examiner

METHOD FOR LOCATING PERSONS AND/OR MOBILE MACHINES IN MINE CAVERNS USING RFID TECHNOLOGY, AND LONGWALL FACE EXTRACTION INSTALLATION FOR CARRYING OUT THE METHOD

The invention relates to a method for locating persons and/or mobile machines in mine caverns using RFID technology, with a plurality of base stations which are arranged in a distributed manner along the mine cavern to be monitored and have a transmitter, with a plurality of receivers which are arranged in a distributed manner along the mine cavern to be monitored, with at least one RFID transponder which is associated with the person or machine to be located, has stored identification data, can be activated using the base station and can be read in a contactless manner using the receivers, and preferably with a central controller for the base stations and receivers. The invention also relates to the preferred field of application of such a method, namely a longwall face extraction installation having shield support frames which are positioned along the longwall face and are intended to keep the longwall face open, having a conveying device for transporting extracted material, having an extraction machine which can be moved back and forth between the ends of the longwall face, and having a device for locating persons and/or machines at the longwall face using RFID technology, the locating device having base stations which are arranged in a distributed manner along the longwall face and have a transmitter, receivers which are arranged in a distributed manner along the longwall face, at least one RFID transponder which is associated with the person or machine to be located, has stored identification data, can be activated using the base stations and can be read in a contactless manner using the receivers, and preferably a central processing unit or central controller for the base stations and receivers.

A person locating system for mine caverns is known from DE 10 2004 024 073 A1. This system operates with person identification chips which, in the event of a hazard, for example if a support frame is intended to be moved, are electromagnetically irradiated and are thereby caused to transmit an electromagnetic response signal. The person identification chip or transponder is respectively provided with a rechargeable battery for the purpose of supplying energy and can, in particular, be associated with the energy supply for a miner's headlamp. Belt conveyor systems or cross-frames, that is to say transfer frames between a longwall face conveyor and a drift conveyor, form the preferred field of application of this person locating system.

DE 10 2008 038 377 B3 discloses the practice of using RFID technology in mining to determine the position and location of parts of the mine cavern in underground coal mining. In this case, monitoring transponders having identification data are installed on shield support frames and nearby base stations in the form of transceiver stations are associated with the monitoring transponders and are used to read the transponders. Reference transponders which have been located using mine surveying are associated with the individual base stations in order to accurately map the mine cavern, such as the longwall face or drift, using the data recorded by the base stations.

There are attempts to also use RFID technology to locate persons in underground mining. US 2007/0264967 A1 describes, for example, such a locating system in which each person wears an RFID transponder which can communicate with other RFID transponders. Communication is effected at a frequency of 2.4 GHz or in a ZigBee network.

Increased safety requirements are imposed on explosion protection and reliability of the devices used in underground mining, in particular in longwall face extraction installations for coal mining. The object of the invention is to provide a method for locating persons and a longwall face extraction installation, in particular for coal mining, which, while taking into account these special features, make it possible to effectively use RFID technology.

In order to achieve this object, the method proposes that the transmitters of adjacently positioned base stations along a region of the mine cavern to be monitored successively emit their transmission wave in order to activate an RFID transponder. Although it would be possible, in principle, for the transmitters of all base stations to permanently transmit their transmission wave at full power in order to activate individual RFID transponders present in that region of the mine cavern which is to be monitored and to then locate said transponders using the receivers, the energy losses of such a system would be disadvantageously high and, at the same time, the entire equipment used as well as every miner would be permanently exposed to relatively high electromagnetic radiation. The solution according to the invention provides for at least adjacent transmitters to emit their transmission wave in temporal succession, a time window which is required for the emission operation and receiving operation possibly being able to be selected to be relatively small and possibly even in the milliseconds range, and so even longwall face lengths of several hundred meters can be fully scanned within a short time. As a result of the fact that a multiplicity of transmitters are provided along the region to be monitored, the transmission cone which necessarily has to be emitted for each transmitter for full monitoring is relatively small, as a result of which the longwall face can be scanned with comparatively little instantaneous use of energy and thus little electromagnetic loading for man and machine.

SUMMARY

According to one advantageous refinement of the method according to the invention, all base stations along the region to be monitored can successively emit their transmission wave, the locally next neighbour using its transmitter to emit the transmission wave temporally after a base station in each case according to one variant. According to another refinement, emission can be effected in such a manner that only a single transmitter along the entire mine cavern ever emits its transmission wave at a particular point in time. Alternatively, a plurality of transmitters can emit their transmission wave at the same time or at approximately the same time at a particular point in time, in which case the currently active transmitters should be in different sections of the mine cavern to be monitored. The method can therefore be carried out in such a manner that the entire mine cavern is subdivided into sections and each section is sequentially scanned independently of another section, that is to say by successively emitted transmission waves from the base stations positioned in the respective section.

Inside the entire mine cavern or inside a section, the transmitters can generate their transmission waves in random temporal sequences or in predefined temporal sequences. A predefined temporal sequence may be, for example, a sequence in which the next local neighbour emits its transmission wave in one direction in each case after the previous base station has concluded the scanning operation, at least the emission of the transmission wave for activating an RFID transponder, fully or to the greatest possible extent. A central processing unit or central controller can also be used to match the temporal sequence to the information available in the previous scanning operation. If the central processing unit knows, for example, that the machine to be located or a person to be located is in a particular section of the mine cavern and otherwise no persons or machines are present, the scanning process can also be carried out solely in this section. Alternatively, if a particular section of the mine cavern is intended to be evacuated, the temporal sequences can be controlled in such a manner that the transmitters successively emit their transmission wave only in the evacuated section of the mine cavern in order to ensure that no persons are in this section of the mine cavern because no RFID transponder is detected in the monitored section of the mine cavern. Selecting the temporal sequence also makes it possible, in particular, to compensate for transponders being triggered in error by other machines or devices.

Particular sections can also be scanned section by section if the direction of travel of a mobile machine or a vehicle, for example, is known and the route of the machine or a vehicle is intended to be investigated in advance. Sequentially transmitting transmission waves using the individual transmitters produces a signal wave which sequentially propagates along the mine cavern or longwall face, even if respectively generated by another transmitter, and passes through a section or the entire mine cavern, for example, in one direction, depending on the configuration of the temporal sequence, in order to detect all RFID transponders present in the mine cavern in this pass and to then use the central controller to locate those sections or regions in which RFID transponders are present.

In one particularly advantageous refinement of the method according to the invention, the signal strength of the transmission wave from each transmitter can be changed in order to determine the distance between a detected RFID transponder, in particular a transponder associated with a person, and the nearest base station or the nearest receiver. In a preferred refinement, each base station has both a transmitter and a receiver. However, a smaller number of receivers could also be used and/or the receivers are designed and positioned separately from the transmitters.

The particularly preferred refinement of the method relates to the practice of locating persons at longwall faces of mining extraction installations, corresponding mining extraction installations being provided with shield support frames which are positioned along the longwall face and are intended to keep the longwall face open, with a conveying device for transporting extracted material and with an extraction machine which can be moved between the ends of the longwall face usually along the conveying device. In the case of such a locating device for longwall faces of mining extraction installations, the base stations are preferably associated with every shield support frame, but possibly only every nth shield support frame, where n assumes any desired natural number between and 2 and 5, and therefore 2≤n≤5. In this case, it is not absolutely necessary for the distance between the base stations having corresponding transmitters, which can emit with a time delay, to remain the same in each case, as long as the distance between two base stations does not become so long that complete coverage of the entire mine cavern can no longer be ensured with the transmission cones of the transmission waves from transmitters of adjacent base stations.

The invention also relates to a longwall face extraction installation for carrying out the method, in which, according to the invention, a base station is associated with every shield support frame or every nth shield support frame, where n=2 to 5, and the base stations can be controlled using the central processing unit or central controller in such a manner that the transmitters at least of adjacently positioned base stations successively emit their transmission wave in order to activate an RFID transponder. As explained further above, the transmission waves can be emitted in the method variants preferably stated for the method and the time-delayed transmission of the transmission waves can be carried out in random or predefined temporal sequences over the entire mine cavern or over sections.

It is particularly advantageous if the signal strength of the transmission wave from each transmitter can be changed or is changed in order to determine the distance between a detected RFID transponder, in particular a transponder associated with a person, and the nearest base station. The length of the emitted transmission cone is changed by varying the signal strength of the transmission wave. If an RFID transponder was detected in a particular section in a previous scanning pass, it is possible to determine when a particular RFID transponder still responds, that is to say is activated, and when it does not respond by continuously reducing and increasing the signal strength and thus the scanning range. The approximate distance can then be inferred from the currently emitted signal strength since the signal strength is approximately in a predefined ratio to the scanning range and thus to the activation range for an RFID transponder.

In the case of a longwall face extraction installation or a method carried out there, a first RFID transponder may be arranged on the machine and at least one second RFID transponder is provided for locating people according to one method variant. It goes without saying that an RFID transponder is associated with every person in an underground longwall face since only then is it possible to reliably locate persons in a longwall face extraction installation. The RFID transponder associated with the machine can be used, on the one hand, to regularly determine where the respective extraction machine is located; in particular, however, the RFID transponder which is concomitantly moved with the extraction machine makes it possible to regularly check the method of operation of the individual base stations since the extraction machine is detected once or several times during each pass, depending on the speed of the temporal sequence in which the transmission waves are transmitted. In order to increase the redundancy of the entire locating device, each shield support frame, which also has an associated base station, may have an associated RFID reference transponder which is respectively fitted to a section of the conveying device in front of the respective shield support frame which is provided with the base station. Since, in an underground longwall face, persons are at best in the region between the conveying device and the shield support frames during ongoing operation anyway, the reference transponders fitted to the conveying device therefore always make it possible to check the method of operation of the associated base station during each scanning operation, and therefore each time a transmission wave is transmitted, if the signal strength of the respective transmission wave is not selected to be so low that the scanning range is shorter than the distance between the base station on the shield support frame and the conveying device. The distance varies since it depends on the current extension length of the rear beam for moving the extraction installation.

According to another aspect, the central processing unit can be used to select a section along the longwall face, inside which the transmitters of the base stations successively transmit a transmission wave and/or inside which the transmitters transmit transmission waves with a signal strength which preferably changes continuously in order to check an evacuated region, for example, to determine the distance between personal transponders and the base station or to carry out other tasks.

In a longwall face extraction installation, it is particularly advantageous if possibly every entry region at the end of the longwall face has an associated detection device which is used to detect every person accessing the longwall face, including the RFID transponder worn by said person, and to report said person to the central processing unit. An extraction longwall face is normally accessed only from the main gate. The arrangement of a detection unit in the entry region on the main gate can then suffice to detect, at any time using the central processing unit, which transponders and, in this respect, which persons are currently at the longwall face. If no person present at the longwall face is reported to the central processing unit, the number of scanning sequences can be considerably reduced and a pure monitoring function can be performed at particular intervals of time and the notification to the central processing unit that no person is present can therefore be verified. If, in contrast, one or more persons are present at the longwall face, the number and frequency of the temporal sequences, in which the transmitters emit their transmission waves, can be increased in order to reliably detect the current position of the individual transponders and thus of the persons present at any time. In this case, the detection device preferably also comprises a sensor which is not tied to RFID, for example a camera with image recognition, in order to ensure that no person without an RFID transponder accesses or has accessed the longwall face to be monitored. The detection device can use a detection signal, such as an optical or acoustic signal, to indicate to a person accessing the longwall face whether the person has been detected and whether his RFID transponder is working. In this refinement, it is particularly advantageous if a safe region for at least one person to stay is defined on each shield support frame, and the extraction machine can be controlled in such a manner that it is possibly even automatically switched off if not all of the RFID transponders reported to the central processing unit for persons are detected inside a safe region to stay. The automatic switching-off operation can also be limited to sections of the longwall face in which it is known that either the extraction machine is moving there or else a moving-up operation of individual shield support frames is imminent or is taking place. Since the individual activities of the shield support frames and of the extraction machine are known to the control units for the shield support frames and possibly to the central processing unit, in particular in a fully automatic longwall face, the longwall face can be subdivided in this respect into sections with a different level of risk and particular machine sequences, for example the moving operation of the conveying device or the advancing operation of a shield support frame, can be automatically switched off or disabled in a corresponding manner in the central processing unit or microelectronics of the base stations or the like.

Both in the method and in the longwall face extraction installation, it is particularly advantageous if the RFID transponders are in the form of an active tag or semi-active tag. An RFID transponder is located by virtue of the fact that, whenever a transponder is in the transmission range of the transmission wave from a transmitter, it is excited by the transmission wave to transmit its identification signal to the receiver of the base station. In the case of active tags, which also include the semi-active tags, an item of information relating to the transmitter which has activated the transponder is also included with the stored identification data, with the result that both the transmission source and an item of information relating to the transponder are present for the transmitter and the central processing unit can obtain the necessary information therefrom. Using an at least semi-active tag therefore makes it possible for every transponder activated by the transmission wave from a transmitter to return not only its stored identification data but also, at the same time, information relating to the transmitter from which it has received the activation signal to the associated receiver.

Alternatively or additionally, it is particularly advantageous if the transmitters emit a signal wave which is preferably modulated in the low-frequency band, and the RFID transponders activated by the signal wave emit an identification wave in the radio-frequency range, and the receivers are designed to read the identification wave in the radio-frequency range. For the purpose of activation, the transmitters may emit, in particular, signal waves in the frequency range of between 90 and 135 kHz and/or the transponders transmit in the radio-frequency range of, for example, 868 MHz, 433 MHz, 2.4 GHz or 5.5 GHz. The range of the individual signal waves from the transmitters greatly depends on the selected frequency and the configuration of the antennas which are associated with the respective transponders in addition to the memory chip with the stored information data or base stations.

As is known to a person skilled in the art, a central processing unit or central controller may be arranged separately. However, it may also form part of the microelectronics of a base station or all base stations, depending on the manner in which the individual base stations can communicate with one another.

BRIEF DESCRIPTION OF THE DRAWINGS

Further advantages and refinements of the method emerge from the following description of a preferred exemplary embodiment of a longwall face extraction installation in which a preferred refinement of the method is carried out. In the drawing.

DETAILED DESCRIPTION

Figure 1:
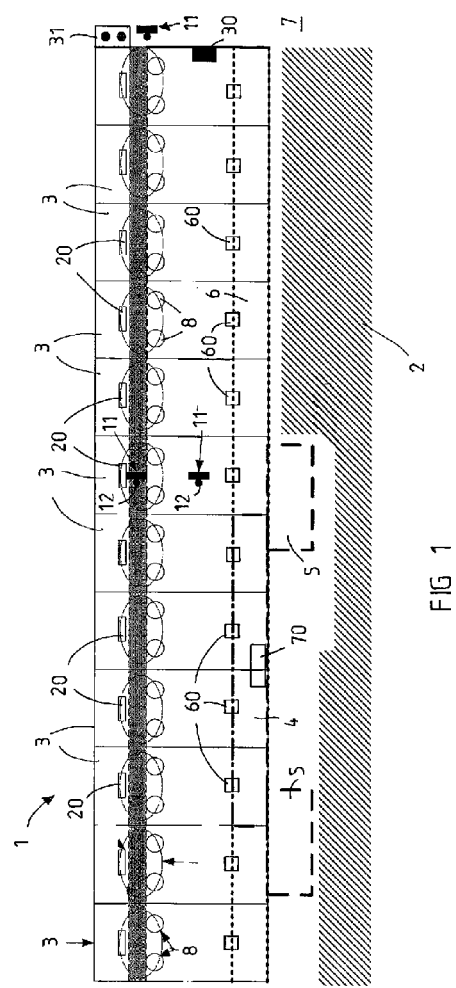
FIG. 1 diagrammatically shows a highly simplified plan view of an underground longwall face with a device for locating persons.

In FIG. 1, reference symbol 1 is used overall to denote an extraction installation which is arranged in an underground mine cavern possibly of any desired length. Since minerals such as coal, in particular, are extracted in the mine cavern at the working face denoted using the reference symbol 2, this mine cavern is normally referred to as a longwall face. The extraction installation 1 comprises a multiplicity of shield support frames 3 which are arranged beside one another and are used to keep the underground longwall face open in order to extract minerals at the working face 2 using an extraction machine 4 which, in the exemplary embodiment shown, is formed by a shearer loader with two shearer drums 5. The material removed at the working face 2 using the shearer loader 4 is transferred to a diagrammatically indicated conveyor 6 which forms the conveying device in order to transport the extracted material from the longwall face and to transfer it to a drift conveyor (not illustrated) in the drift denoted using reference symbol 7. Only the two props 8 which are used to press a shield canopy against the so-called hanging wall in order to reliably position the conveyor 6 under the shield canopy and simultaneously extract material at the working face 2 using the extraction drums 5 are respectively indicated on the shield support frames 3. The conveyor 6 simultaneously forms the guide device for the extraction machine 4 which can be moved between the two ends of the longwall face.

FIG. 1 also indicates three persons 11, one of the persons being in a safe region to stay inside a shield support frame, which region is usually formed close to the props 8, as is known to a person skilled in the art of underground mining. The standing region may also form part of a so-called rear travelling channel along which the miner 11 can safely move at the longwall face. A second miner is outside the safe standing region between the conveyor 6 and the props 8 in the same shield 3. A third miner 11 is still in the drift 7. Every miner 11 is provided with an RFID transponder 12 which is indicated using a circle in FIG. 1, these RFID transponders 12 each being an active tag (or semi-active tag) which is fed using a rechargeable battery and is worn by the miner 11, for example on a belt or helmet. As diagrammatically shown in FIG. 2, every transponder 12 has a memory chip 13 with identification data relating to the RFID transponder 12 and, in this respect, also relating to the miner 11 wearing the corresponding transponder 12. In the exemplary embodiment of the extraction installation 1 shown in FIG. 1, each shield support frame 3 also has an associated base station 20 which, based on the working face 2 in this case, is on the goaf side of the two props 8 and also on the goaf side of the safe standing region for a miner 11 and is positioned there, for example together with a control device for the respective shield support frame 3.

Figure 2:
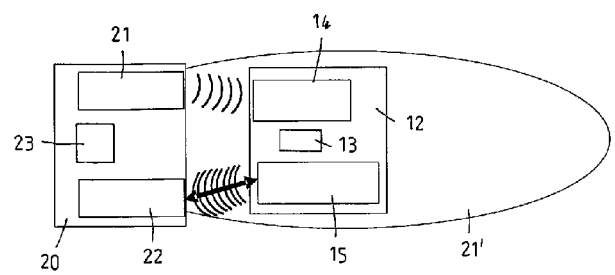
FIG. 2 uses a diagram to diagrammatically show the structure and contactless communication between a base station and a transponder.

FIG. 2 diagrammatically shows the interaction between a base station 20 and an RFID transponder 12. For the inventive use of RFID technology in the extraction installation according to the invention, the base station 20 comprises a transmitter 21 in the form of a low-frequency transmitter which is used to generate a transmission signal within a transmission cone indicated using reference symbol 21' if the transmitter 21 in the base station 20 is activated. The transmitter 21 forms a so-called exciter within RFID technology. In the exemplary embodiment shown, the base station 20 furthermore also comprises a receiver 22 which consists of a radio-frequency receiver in this case. However, the receiver could also be formed separately from the base station. The receiver 22 within such a base station 20 is sometimes also referred to as an access point in RFID technology. In order to activate the transmitter 21 and the receiver 22 and to supply them with energy, the base station 20 also has an energy supply 23 which can possibly also be provided with suitable electronics for controlling or activating the transmitter 21 and for reading the receiver 22 and at the same time can carry out data communication with other base stations and/or with a superordinate central controller or central processing unit, which could also be arranged underground or in the drift for example, via suitable interfaces, for example an Ethernet interface. The RFID transponder 12 as an active tag or semi-active tag is provided with a memory chip 13, which stores at least the identification data for the transponder 12, and comprises, possibly in a manner integrated with the memory chip 13, a low-frequency receiver section 14 for receiving the low-frequency waves from the transmitter 21 and a radio-frequency transceiver 15 for emitting a radio-frequency response signal. The transponder 12 also comprises an antenna (not illustrated) in order to be able to receive the low-frequency transmission waves and/or transmit radio-frequency response waves. The RFID transponder 12 is activated by the low-frequency receiver 14 receiving the transmission wave from the transmitter 21 of the base station 20. Upon receiving a transmission wave from the transmitter 21, the transceiver section 15 is activated and transmits, in a radio-frequency response signal, the identification data stored on the memory chip 13 together with an identification signal to the receiver 22 of the base station 20. The identification signal makes it possible to clearly identify which transmitter 21 or which transmitting station 20 has activated the transponder 12. The receiver 22 of the base station 20 therefore receives, via the radio-frequency response signal, not only the information relating to the identification data on the chip 13 but also information relating to which base station of a plurality of base stations 20 has activated the RFID transponder 12. The radio-frequency response signal from the transceiver 15 may be effected, for example, in the 2.4 GHz band, whereas the transmitters 21 preferably transmit a low-frequency signal in the frequency band of between 90 kHz and 135 kHz.

In order to be able to use base stations 20 to now detect a transponder 12 and, via the latter, also a person or a machine, who or which is provided with a corresponding transponder 12, at the underground longwall face, the entire longwall face is sequentially scanned in a random order or preferably in a predefined order, the scanning process being able to be effected in different scanning sequences or cycles depending on the starting situation. This is now explained with reference to the scanning sequence in FIGS. 3A to 3D.

Figure 3A:
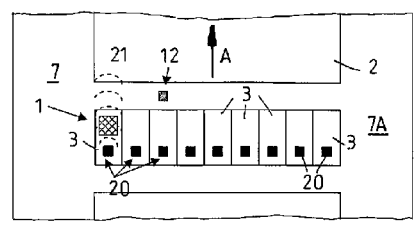
FIGS. 3A-3D show the preferred sequence according to the method for locating a person at a longwall face using a device according to the invention.
Figure 3B:
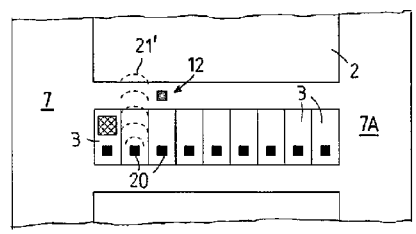

FIGS. 3A to 3D diagrammatically show, in a highly simplified manner, a method sequence with a particularly preferred scanning order. In FIGS. 3A to 3D, reference symbol 2 is used to denote the working face, reference symbol 3 is used to denote the shield support frames positioned beside one another, reference symbol 20 is used to denote every available base station, reference symbol 7 is used to denote a main gate and reference symbol 7A is used to denote an auxiliary drift. The working direction of the extraction installation 1 is indicated using the arrow A in FIG. 3A; the extraction machine and the conveyor are not illustrated. Each shield support frame 3 is provided with a base station 20. As FIG. 3A reveals, the transponder 12 to be located is in front of the third shield support frame 3, as seen from the main gate 7. In a first scanning operation, the first shield support frame 3 uses the base station 20 associated with this shield support frame 3 to transmit a low-frequency transmission signal, as indicated using the transmission waves 21". The transmitter 21 emits the transmission cone 21 or its transmission waves 21" transversely with respect to the longitudinal extent of the longwall face and transversely with respect to the direction of travel of the extraction machine. The emission cone of these transmission waves 21" detects substantially only the region in front of the respective shield support frame 3. The scanning operation at a shield support frame 3 requires a time window in the milliseconds range. The transponder 12 is outside the transmission cone and is therefore not activated by the transmission waves 21". In the next step, as illustrated in FIG. 3B, the transmitter of the next base station 20 on the directly adjacently positioned shield support frame 3 is now activated and consequently emits its transmission waves 21'. The activation of each base station 20 at a particular point in time can be controlled and regulated, in particular, by the central controller. All other base stations 20 are inactive and are currently not transmitting a transmission signal. The transponder 12 is again not detected.

Figure 3C:
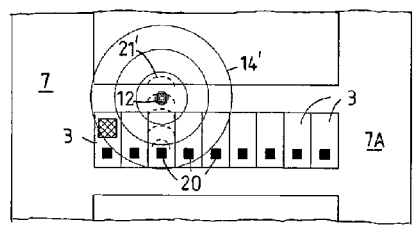

The transponder 12 is activated only in the scanning operation in FIG. 3C by the transmission waves 21' emitted by the associated base station 20 and the transponder 12 transmits its response signal in any desired direction, as indicated using the circular response waves 14'. The response signal 14' is detected at least by the receiver section of the base station 20 which has also emitted the transmission waves 21", but possibly also by the base stations 20 of adjacent shield support frames 3. Since the signal wave 14' contains not only the identification data for the transponder 12 but also information relating to which of the base stations 20 has activated the transponder 12, every base station 20 which is ready to receive can, in principle, notify the central processing unit or all other base stations 20 of where the transponder 12 and thus a person wearing this transponder 12 are currently situated. In order to make it possible to reliably distinguish between the base stations 20 and the shield support frames 3 with which these base stations 20 are associated in the event of a response signal from a tag 12 being received by a plurality of receivers of base stations 20, the low-frequency signal which is respectively emitted by the transmitters 21 can be modulated in a slightly different manner for each shield support frame 3.

Figure 3D:
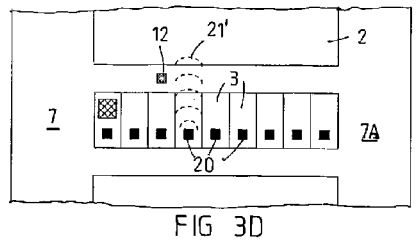

FIG. 3D shows the situation a short moment later when the transmitter of the base station 20 of the fourth shield support frame 3 emits its transmission waves 21". Since the transponder 12 is not in the transmission cone of this base station 20, it is no longer activated. The same thing would happen in all further scanning operations in the sequence shown in FIGS. 3A-3D. In FIGS. 3A-3D, the locating device can therefore determine and confirm detection of a transponder 12 in front of the third shield 3 in this case. In a normal sequence, all other base stations 20 of the other shield support frames 3 are also briefly activated in order to check whether and possibly where further transponders are activated by the emission of a transmission wave. The sequence may be carried out in such a manner that the base station of the shield support frame which is nearest in one direction is respectively activated next in order to emit a transmission wave 21". The longwall face length is therefore sequentially scanned with a transmission cone which is successively generated by every available base station 20 and scans the entire longwall face length in a short time. With an order of the scanning operations in which the nearest base station respectively emits its transmission cone, it is possible to ensure that a person cannot remain undetected by accident between two transmission cones even if the person is moving. The transmission cone emitted by each base station 20 should, in any case on account of its signal strength, initially have a length which suffices to detect the entire region between the base station 20 and the goaf-side channel wall of the conveying device since only this region can form the region for a person wearing a transponder 12 to stay.

Reference is now again made to FIG. 1. FIG. 1 indicates that a reference transponder 60 can additionally be arranged on the goaf-side side wall of the channel conveyor, in a manner respectively associated with each base station, in order to calibrate and/or check the respective base station 20 during each scanning operation, that is to say each time a transmission cone is emitted, since the base station 20 and the central processing unit can discern, from the signal returned by the transponder 60, that it is a transponder 60 on the conveyor. Alternatively or additionally, as likewise indicated in FIG. 1, a further transponder 70 could furthermore also be fitted to the extraction machine 4, which further transponder is concomitantly moved with the machine 4, thus resulting in additional method variants and control possibilities.

In a particularly advantageous refinement of an extraction installation 1 according to the invention, as indicated on the main gate 7 in FIG. 1, each longwall face access may have an associated detection device 30 which may consist of a camera and an associated RFID base station, for example, in order to detect every miner 11 who accesses the longwall face using an image recognition system, on the one hand, and RFID technology, on the other hand. If a person is indeed detected using the camera, but it is not determined that the person is also simultaneously wearing a transponder 12, the respective miner 11 could be informed, via a signalling device such as the diagrammatically indicated traffic lights 31 or else acoustically, that entry is not allowed; otherwise, the entire extraction installation 1 is switched off. The detection device 30 can be simultaneously used to ensure that all base stations 20 and/or a superordinate central processing unit know which transponders 12 and, in this respect, which miners 11 are within the longwall face. If information relating to the fact that one or more transponders are within the longwall face is available, the extraction installation may be automatically switched off and/or the scanning intervals can be correspondingly increased with the base stations in order to have reliable knowledge of where each transponder 12 and therefore each miner 11 is situated at any time. It is advantageous, in particular for such a case, if the base stations 20 can be controlled or activated in such a manner that only particular sections of the longwall face are scanned because it is known, for example, that a transponder 12 is present in this section. Depending on the position of the extraction machine 4 and of that region in which the individual shield support frames 3 wish to carry out an advancing operation in an automated manner, an automatic operation for switching off the entire extraction installation 1 can be initiated when a transponder 12 is outside the safe standing region, that is to say directly in front of a base station 20 and behind the props 8 of a shield support frame 3.

Figure 4:
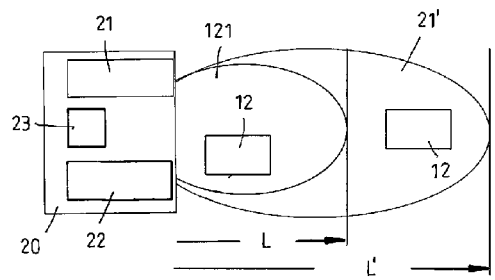
FIG. 4 uses another diagram to diagrammatically show the variation of the signal strength for detecting the distance between a transponder and a base station.

FIG. 4 uses another diagram to illustrate how the accuracy with which a transponder 12 is located can be increased using the base stations 20. FIG. 4 shows, on the one hand, the transmission cone 21' of the transmission wave like in the previous exemplary embodiment, in which the transmitter 21 transmits its transmission wave at full signal strength. In FIG. 4, reference symbol 121 is used to illustrate a second transmission cone which is generated by the same transmitter 21 in the low-frequency band but in which the signal strength has been reduced to 50%, for example. Whereas the two transponders 12 shown are still detected and activated with the transmission cone 21' and accordingly return their response signal to the receiver 22, only the front transponder 12 is activated by the transmission waves within the transmission cone 121, in which case it can be inferred from the emitted signal strength that one of the two transponders 12 is at a distance L from the base station 20 and the other transponder 12 is at a distance L'-L from the base station 20. The current position of the respective RFID transponder 12 can therefore be determined in a relatively accurate and comparatively simple manner by dynamically reducing and/or increasing the transmission cones 21' and 121.

Numerous modifications which are intended to fall within the scope of protection of the appended claims emerge for a person skilled in the art from the above description. The base stations can also have a different structure. The receivers may also be formed separately from the base stations. Since the range of the radio-frequency signal is greater than that of a low-frequency signal, receivers could be arranged only sporadically and the number of receivers can then be less than the number of transmitters. The transponders and/or base stations may each have a plurality of antennas. The transmitters in the base stations may also be produced, for example, by a coaxial cable which has been provided with a slot at selected locations in order to allow the transmission signal to emerge from the transmission cable there. In this case, the position of the active signal source can be determined using the speed of the signal inside the cable and the positions of the slots. Such production of a signal source is primarily suitable when the method according to the invention is intended to be used to monitor gates or the like. With a corresponding design of the system, a plurality of transmitters may also emit their transmission waves at the same time, for which purpose the mine region to be monitored is subdivided into sections and a transmitter possibly emits its transmission wave at the same time in each section. In particular situations, for example when the intention is to monitor only a section of a longwall face in which it would be particularly dangerous for a person to stay, the method could also be carried out in such a manner that only this section is monitored by respectively activating the individual transmitters in succession.

The invention claimed is:

1. A method for locating persons or mobile machines in a mine cavern using RFID technology; comprising: providing a plurality of base stations arranged in a distributed manner along the mine cavern to be monitored, one or more of the base stations having a transmitter and one or more receivers; providing at least one RFID transponder associated with the person or machine to be located, the RFID transponder having stored identification data, is activatable using the base station and readable in a contactless manner using the receivers; wherein the transmitters of adjacently positioned base stations along a region of the mine cavern to be monitored successively emit their transmission wave in order to activate an RFID transponder; wherein a signal strength of the transmission wave from each transmitter is changeable and is changed in order to determine a distance between a detected RFID transponder and a nearest base station.

2. The method according to claim 1, wherein all base stations along the region to be monitored successively emit their transmission wave, and a locally next neighbour using its transmitter to emit the transmission wave temporally after a base station in each case.

3. The method according to claim 1, wherein only a single transmitter emits the transmission wave at a particular point in time.

4. The method according to claim 1, wherein a plurality of transmitters emit their transmission wave at a particular point in time, with one or more currently active transmitters being in different sections of the mine cavern to be monitored.

5. The method according to claim 1, wherein the transmitters generate their transmission waves in random or pre-defined temporal sequences and/or the transmitters successively emit their transmission wave only in a section of the mine cavern.

6. The method according to claim 1, wherein the mine cavern comprises longwall faces of mining extraction installations, and further comprising shield support frames which are positioned along the longwall face and are intended to keep the longwall face open, and a conveying device for transporting extracted material and an extraction machine which is movable between ends of the longwall face, wherein a base station is associated with every shield support frame or every nth shield support frame, where n=2 to 5.

7. The method according to claim 1, wherein each of the base stations have a transmitter and a receiver.

8. A longwall face extraction installation, comprising:
shield support frames arranged along the longwall face;
a conveying device for transporting extracted material;
an extraction machine movable between ends of the longwall face;
a device for locating persons or machines at the longwall face using RFID technology, the device having base stations arranged in a distributed manner along the longwall face and having a transmitter, and one or more receivers arranged in a distributed manner along the longwall face, and at least one RFID transponder associated with the person or machine to be located, wherein the RFID transponder has stored identification data, is activatable using the base stations and is readable in a contactless manner, and a central controller for the base stations;
wherein a base station is associated with every shield support frame or a base station is associated with every nth shield support frame, where n=2 to 5, and the base stations are controllable using the central controller in such a manner that the transmitters of adjacently positioned base stations successively emit their transmission wave in order to activate an RFID transponder.

9. The longwall face extraction installation according to claim 8, wherein a first RFID transponder is arranged on the extraction machine and at least one second RFID transponder is configured for locating persons.

10. The longwall face extraction installation according to claim 8, wherein each base station has an associated RFID reference transponder which is respectively fitted to a section of the conveying device in front of the respective base station.

11. The longwall face extraction installation according to claim 8, wherein the central controller is usable to select a section along the longwall face, inside which the transmitters of the base stations successively transmit a signal wave and/or inside which the transmitters transmit signal waves with a signal strength which preferably changes continuously.

12. The longwall face extraction installation according to claim 8, wherein the longwall face has an entry region at the end of the longwall face, which region has an associated detection device which is configured to detect every person accessing the longwall face, including the RFID transponder worn by said person, and to report said person to the central controller.

13. The longwall face extraction installation according to claim 12, wherein a safe region configured for a person to stay is defined on each shield support frame, and the extraction machine is controllable in such a manner that the extraction machine is switched off if not all of the RFID transponders reported to the central controller for persons are detected inside the safe region to stay.

14. The longwall face extraction installation according to claim 8, wherein the RFID transponders are in a form of an active tag or semi-active tag.

15. The longwall face extraction installation according to claim 8, wherein the transmitters emit a signal wave which is preferably modulated in a low-frequency band.

16. The longwall face extraction installation according to claim 15, wherein, the RFID transponders are activated by the signal wave emitting an identification wave in the radio-frequency range, and wherein the receivers being designed to read the identification wave.

17. The longwall face extraction installation according to claim 8, wherein each of the base stations have a transmitter and a receiver.

18. A method for locating persons or mobile machines in a mine cavern using RFID technology; comprising:
providing a plurality of base stations arranged in a distributed manner along the mine cavern to be monitored, one or more of the base stations having a transmitter and one or more receivers;
providing at least one RFID transponder associated with the person or machine to be located, the RFID transponder having stored identification data, is activable using the base station and readable in a contactless manner using the receivers;

wherein the transmitters of adjacently positioned base stations along a region of the mine cavern to be monitored successively emit their transmission wave in order to activate an RFID transponder;

wherein the mine cavern comprises longwall faces of mining extraction installations, and further comprising shield support frames which are positioned along the longwall face and are intended to keep the longwall face open, and a conveying device for transporting extracted material and an extraction machine which is movable between ends of the longwall face, wherein a base station is associated with every shield support frame or every nth shield support frame, where n=2 to 5.

19. The method according to claim 18, wherein a signal strength of the transmission wave from each transmitter is changeable and is changed in order to determine a distance between a detected RFID transponder and a nearest base station.

* * * * *